(12) United States Patent
Van Der Zon et al.

(10) Patent No.: US 7,442,664 B2
(45) Date of Patent: Oct. 28, 2008

(54) PROCESS FOR THE PREPARATION OF AN FCC CATALYST

(75) Inventors: Monique Van Der Zon, Purmerland (NL); Jan Hendrik Hilgers, Beverwijk (NL)

(73) Assignee: Albemarle Netherlands B.V., Amersfoort (NL)

( * ) Notice: Subject to any disclaimer, the term of this patent is extended or adjusted under 35 U.S.C. 154(b) by 0 days.

(21) Appl. No.: 11/939,413

(22) Filed: Nov. 13, 2007

(65) Prior Publication Data

US 2008/0146436 A1    Jun. 19, 2008

Related U.S. Application Data

(60) Provisional application No. 60/858,365, filed on Nov. 13, 2006.

(51) Int. Cl.
*B01J 29/06* (2006.01)
(52) U.S. Cl. .............................. 502/63; 502/64; 502/68; 502/72; 502/79; 502/80; 502/84
(58) Field of Classification Search .................. 502/63, 502/64, 68, 72, 79, 80, 84
See application file for complete search history.

(56) References Cited

U.S. PATENT DOCUMENTS

| 4,443,553 | A | 4/1984 | Chiang et al. |
| 5,801,115 | A | 9/1998 | Albers et al. |
| 6,027,706 | A | 2/2000 | Pinnavaia et al. |
| 6,342,153 | B1 * | 1/2002 | Guan et al. ................. 208/118 |
| 6,589,902 | B1 | 7/2003 | Stamires et al. |
| 6,673,235 | B2 | 1/2004 | Harris et al. |
| 6,716,785 | B2 | 4/2004 | Stamires et al. |
| 6,903,040 | B2 | 6/2005 | Stamires et al. |
| 6,942,784 | B2 | 9/2005 | Stockwell et al. |
| 7,101,473 | B2 | 9/2006 | Hurley |
| 7,160,830 | B2 | 1/2007 | van der Zon et al. |
| 7,208,446 | B2 | 4/2007 | Stamires et al. |

FOREIGN PATENT DOCUMENTS

| DE | 29 07 671 A1 | 9/1980 |
| GB | 1 376 885 | 12/1974 |
| GB | 2 109 696 A | 6/1983 |

* cited by examiner

*Primary Examiner*—Elizabeth D Wood
(74) *Attorney, Agent, or Firm*—Jeremy J. Kliebert

(57) ABSTRACT

This invention relates to a process for the preparation of a fluid catalytic cracking catalyst with improved attrition resistance. According to this preparation process, an aqueous slurry comprising a zeolite, day, and poly aluminum chloride is spray-dried and subsequently calcined, the poly aluminum chloride having the formula $[Al_2(OH)_yCl_{6-y}]_x$, wherein x is at least 1 and y is greater than 2 and smaller than 4.

7 Claims, No Drawings

PROCESS FOR THE PREPARATION OF AN FCC CATALYST

The present invention relates to a process for the preparation of a fluid catalytic cracking (FCC) catalyst by spray-drying an aqueous slurry comprising a zeolite, clay, and poly aluminum chloride.

Poly aluminum chloride—also called aluminum hydroxy chloride, aluminum oxychloride, or aluminum chlorohydroxide—typically has the formula $[Al_2(OH)_yCl_{6-y}]_x$, wherein x is at least 1 and y can range from about 1 to about 5. The compound wherein y=5 is commonly referred to as aluminum chlorohydrol.

Poly aluminum chloride has been used before in the preparation of FCC catalysts. For instance, U.S. Pat. No. 4,443,553 discloses a process for the preparation of an FCC catalyst by spray-drying an aqueous slurry containing a Y-type zeolite, an alumina-containing binder, a silica source, and an aluminum hydroxy chloride additive with the formula $[Al_2(OH)_yCl_{6-y}]_x$, wherein x ranges from 1 to 6, and y ranges from 4 to 5. So, the OH/Al ratio of this aluminum hydroxy chloride ranges from 2 to 2.5. The aluminum hydroxy chloride additive was added to the slurry in an amount of 0.5 to 2.5 wt %, calculated as $Al_2O_3$, and based on the solids content of the slurry.

GB 2 109 696 discloses a process for the preparation of FCC catalyst particles involving spray-drying of an aqueous mixture of an alkali metal-containing zeolite, clay, and aluminum chlorohydrol with an OH/Al ratio of 2 to 2.67 and, hence, a y-value in the above-mentioned formula in the range of 4 to 5.14. The resulting particles are subsequently calcined and ion-exchanged.

For use in a fluidized bed, highly attrition resistant catalyst particles are desired. Hence, there is an ongoing need for FCC catalysts with Improved attrition resistance.

Surprisingly, it has now been found that the attrition resistance of FCC catalysts can be increased by using poly aluminum chloride $[Al_2(OH)_yCl_{6-y}]_x$ with a y-value and, hence, an OH/Al ratio in a specific range.

The present invention therefore relates to a process for the preparation of a fluid catalytic cracking catalyst wherein an aqueous slurry comprising a zeolite, clay, and poly aluminum chloride is spray-dried and subsequently calcined, the poly aluminum chloride having the formula $[Al_2(OH)_yCl_{6-y}]_x$, wherein x is at least 1 and y is greater than 2 and smaller than 4. In other words, the OH/Al ratio in the poly aluminum chloride is greater than 1 and less than 2.

In a preferred embodiment, the value of y ranges from about 2.2 to about 3.6. In an even more preferred embodiment, the value of y ranges from about 2.4 to about 3.0.

A conventional manner of producing poly aluminum chloride is the attack of aluminum metal with hydrogen chloride. Other methods are disclosed in GB 1,376,885 and DE 29 07 671. The first document discloses a process, which involves the attack of aluminum hydroxide particles (gibbsite, boehmite, bayerite) with HCl, followed by electrolysis. The current that is used during the electrolysis determines the Cl/Al ratio and, hence, the OH/Al ratio of the resulting poly aluminum chloride. DE 29 07 671 produces poly aluminum chloride with an Al/Cl ratio of 0:9 (OH/Al=1.9) by cooling a 40-60° C. solution of aluminum chloride solution with an aluminum content of 8 to 13 wt % and an Al/Cl ratio of 0.48 to 0.75 to a temperature of 20° C.

The aqueous slurry that is used in the process according to the invention comprises zeolite, clay, and poly aluminum chloride.

The zeolite is preferably selected from the group of faujasite zeolites (e.g. zeolite X and Y), ZSM-5, phosphorus-exchanged ZSM-5, zeolite beta, MCM-22, MCM-36, ITQ-zeolite, SAPO, ALPO, and mixtures thereof. More preferred are Y-type zeolites such as zeolite Y, ultrastable zeolite Y (USY), rare earth exchanged (ultrastable) zeolite Y (RE-Y and RE-USY), and mixtures of these Y-type zeolites with ZSM-5.

Suitable clays include kaolin, bentonite, English clay, and heat- or chemically treated clays such as meta-kaolin. The clay preferably has a low sodium content, typically below about 0.1 wt % $Na_2O$.

In addition, other compounds can be added to the slurry, such as alumina (e.g. (pseudo)boehmite, gibbsite, heat-treated forms of gibbsite such as flash-calcined gibbsite), silica (e.g. silica sol, sodium silicate, sodium-free silica, (poly)silicic acid), anionic clays (e.g. hydrotalcite), saponite, montmorillonite, highly crystalline alumina, titanates (e.g. barium titanate or calcium titanate, magnesium titanate), calcium silicate, magnesium silicate, mixed metal oxides, layered hydroxy salts, additional zeolites, magnesium oxide, acids, bases, and various metal compounds such as Ti, Zr, V, Nb, Cr, Mo, W, Mn, Fe, Co, Ni, Ru, Rh, Pd, Pt, Cu, Zn, La, and Ce containing compounds.

A specifically preferred additional compound is alumina.

The slurry preferably comprises about 5 to about 30 wt %, more preferably about 7 to about 20 wt %, and most preferably about 8 to about 12 wt % of poly aluminum chloride, calculated as $Al_2O_3$ and based on the total solids content of the slurry. The slurry preferably comprises:

about 10 to about 70 wt %, more preferably about 15 to about 50 wt %, and most preferably about 15 to about 40 wt % of zeolite, about 5 to about 70 wt %, more preferably about 10 to about 60 wt %, and most preferably about 10 to about 50 wt % of clay, and about 1 to about 50 wt %, more preferably about 2 to about 40 wt %, and most preferably about 3 to about 40 wt % of alumina, calculated as $Al_2O_3$.

These weight ranges are all based on the solids content of the slurry.

The solids content of the slurry preferably is about 10 to about 60 wt %, more preferably about 20 to about 50 wt %, and most preferably about 30 to about 46 wt %.

The slurry is prepared by adding the clay, zeolite, and poly aluminum chloride, and optional other components (such as alumina) to water. The clay, zeolite, and other components can be added as dry solids or in aqueous suspension. Poly aluminum chloride is added as sol or solution. Any order of addition may be used.

The pH of the slurry to be spray-dried preferably is above about 3, more preferably in the range of about 3 to about 5.5, and most preferably in the range of about 3.5 to about 4.5.

The slurry is spray-dried to form fluidizable particles, i.e. particles with a size in the range of about 10 to about 200 microns, preferably about 20 to about 150 microns. The inlet temperature of the spray-dryer preferably ranges from about 300 to about 600° C. and the outlet temperature preferably ranges from about 105 to about 200° C.

Finally, the catalysts are calcined. The calcination temperature preferably is in the range of about 120 to about 700° C., more preferably in the range of about 400 to about 600° C. Calcination is preferably performed from about 5 minutes to about 3 hours, more preferably about 10 to about 60 minutes. The resulting FCC catalyst has a high attrition resistance.

If so desired, the FCC catalyst may be further treated by ion-exchange procedures, before its use in an FCC process.

EXAMPLES

Example 1

Four catalyst compositions were prepared by mixing 30 wt % of zeolite Y, 50 wt % of kaolin clay, 10 wt % of alumina, and 10 wt % of poly aluminum chloride with water at 35% solids. All weight percentages are based on dry solids content The catalysts 10 differed In the OH/Al ratio (and, hence, in the y-value in the formula $[Al_2(OH)_y Cl_{6-y}]_x$) of the poly aluminum chloride that was used for their preparation. These different poly aluminum chlorides were purchased from Gulbrandsen Chemicals.

The attrition resistance of the catalysts was measured by the standard Attrition Test. In this test, the catalyst bed resides on an attrition plate with three nozzles. The attrition plate is situated within an attrition tube, which is at ambient temperature. Air is forced to the nozzles and the resulting jets bring about upward transport of catalyst particles and generated fines. On top of the attrition tube is a separation chamber where the flow dissipates, and most particles larger than about 16 microns fall back into the attrition tube. Smaller particles are collected in a collection bag.

This test was conducted after calcination of the catalyst samples at 600° C., and it was first run for 5 hours, when the weight percentage of fines collected in the collection bag, based on an imaginary Intake of 50 grams, was determined. This is the initial attrition. The test was then conducted for another 15 hours, when the weight percentage of fines in this time period (5-20 hours) was determined. This is the inherent attrition. The Attrition Index (AI) is the extrapolated wt % fines after 25 hours. So, the more attrition resistant the catalyst is, the lower its AI value.

The attrition indices of the different catalysts are listed in Table 1.

TABLE 1

| OH/Al Of The Poly Aluminum Chloride | y IN $[Al_2(OH)_Y Cl_{6-Y}]_X$ | AI |
|---|---|---|
| 0.9 | 1.8 | 12.4 |
| 1.3 | 2.6 | 7.5 |
| 2.0 | 4.0 | 8.6 |
| 2.25 | 4.5 | 14.1 |

This Table clearly shows the effect of the poly aluminum chloride OH/Al ratio on the attrition resistance of the resulting catalysts. An OH/Al ratio above 1 and below 2 (y above 2 and below 4} results in a higher attrition resistance (i.e. AI value) than an OH/Al ratio outside this range.

Example 2

Four catalyst compositions were prepared by mixing 30 wt % of zeolite Y, 50 wt % of kaolin clay, 10 wt % of alumina, and 10 wt % of poly aluminum chloride with water at 35% solids. All weight percentages are based on dry solids content. The catalysts differed in the OH/Al ratio of the poly aluminum chloride that was used for their preparation.

The different poly aluminum chlorides were prepared by boiling mixtures of aluminum metal and HCl in Al/Cl ratios that correspond to the desired OH/Al ratios, according to the formula $[Al_2(OH)_y Cl_{6-y}]_x$.

The attrition resistance of the catalysts was measured by the Attrition Test outlined in Example 1. The attrition indices of the different catalysts are listed in Table 2.

TABLE 2

| OH/Al Of The Poly Aluminum Chloride | y IN $[Al_2(OH)_Y Cl_{6-Y}]_X$ | AI |
|---|---|---|
| 1.6 | 3 | 6.1 |
| 1.7 | 3.4 | 6.2 |
| 2.0 | 4.0 | 6.6 |
| 2.25 | 4.5 | 7.7 |
| 2.4 | 4.8 | 14.2 |

Also this Table shows that an OH/Al ratio above 1 and below 2 (y above 2 and below 4) results in a higher attrition resistance (i.e. lower attrition) than an OH/Al ratio outside these ranges.

The invention claimed is:

1. A process for the preparation of a fluid catalytic cracking catalyst wherein an aqueous slurry comprising a zeolite, clay, and poly aluminum chloride is spray-dried and subsequently calcined, the poly aluminum chloride having the formula $[Al_2(OH)_y Cl_{6-y}]_x$, wherein x is at least 1 and y is greater than 2 and smaller than 4.

2. The process according to claim 1 wherein y ranges from about 2.2 to about 3.6.

3. The process according to claim 2 wherein y ranges from about 2.4 to about 3.0.

4. The process according to claim 1 wherein the aqueous slurry comprises from about 5 to about 30 wt % of said poly aluminum chloride, calculated as $Al_2O_3$ and based on the total solids content of the slurry.

5. The process according to claim 1 wherein the aqueous slurry additionally contains boehmite, pseudoboehmite, gibbsite, and/or flash-calcined gibbsite.

6. The process according to claim 1 wherein the zeolite is a Y-type zeolite.

7. The process according to claim 1 wherein the clay is kaolin clay.

* * * * *